US009560733B2

(12) United States Patent
Namburu

(10) Patent No.: US 9,560,733 B2
(45) Date of Patent: Jan. 31, 2017

(54) NOZZLE THROAT FOR THERMAL PROCESSING AND TORCH EQUIPMENT

(71) Applicant: LINCOLN GLOBAL, INC., City of Industry, CA (US)

(72) Inventor: Praveen K Namburu, Mount Pleasent, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 16 days.

(21) Appl. No.: 14/625,286

(22) Filed: Feb. 18, 2015

(65) Prior Publication Data

US 2015/0245459 A1 Aug. 27, 2015

Related U.S. Application Data

(60) Provisional application No. 61/943,594, filed on Feb. 24, 2014.

(51) Int. Cl.
*B23K 10/00* (2006.01)
*H05H 1/34* (2006.01)

(52) U.S. Cl.
CPC ........ *H05H 1/34* (2013.01); *H05H 2001/3468* (2013.01); *H05H 2001/3478* (2013.01); *H05H 2001/3484* (2013.01)

(58) Field of Classification Search
CPC .............. H05H 1/34; H05H 2001/3468; H05H 2001/3484; H05H 2001/3478
(Continued)

(56) References Cited

U.S. PATENT DOCUMENTS 3,075,065 A * 1/1963 Buhler .................... B05B 7/226 219/121.49
3,676,638 A 7/1972 Stand
(Continued)

FOREIGN PATENT DOCUMENTS

DE 102004049445 A1 4/2006
DE 202006018163 U1 3/2007
(Continued)

OTHER PUBLICATIONS

International Application No. PCT/IB2015/000209, International Search Report & Written Opinion, 10 pages, May 26, 2015.
(Continued)

*Primary Examiner* — Mark Paschall
(74) *Attorney, Agent, or Firm* — Perkins Coie LLP

(57) ABSTRACT

A nozzle assembly includes an upper portion defining an opening for receiving a gas and a longitudinally extending cylindrical body portion adjacent to the upper portion and defining a passageway for the gas. The nozzle assembly also includes a tip portion adjacent to the body portion, with the tip portion defining a throat channel. The throat channel includes a throat inlet region that focuses a flow of the gas. The throat inlet region is fluidly connected to the passageway via a throat inlet opening. The throat channel also includes an acceleration region that is disposed downstream of the throat inlet region and fluidly connected to the throat inlet region to compress the gas and accelerate the flow of the gas. The throat channel further includes an expansion region disposed downstream of the acceleration region and fluidly connected to the acceleration region to allow the gas to expand.

38 Claims, 4 Drawing Sheets

(58) Field of Classification Search
USPC ........ 219/121.5, 121.51, 121.52, 121.48, 75, 219/121.49
See application file for complete search history.

(56) References Cited

U.S. PATENT DOCUMENTS 3,839,618 A * 10/1974 Muehlberger .......... B05B 7/168 219/121.47
4,909,914 A * 3/1990 Chiba ...................... B01J 19/26 118/715
4,967,055 A 10/1990 Raney et al.
5,076,051 A * 12/1991 Naff ....................... B64G 1/406 219/121.51
5,079,403 A 1/1992 Sturges et al.
5,464,962 A 11/1995 Luo et al.
5,573,682 A * 11/1996 Beason, Jr. .............. H05H 1/34 219/121.47
5,591,356 A 1/1997 Sakuragi et al.
5,601,734 A 2/1997 Luo et al.
5,695,662 A 12/1997 Couch, Jr. et al.
5,747,767 A 5/1998 Severance et al.
5,756,959 A 5/1998 Freeman et al.
5,767,478 A 6/1998 Walters
5,841,095 A 11/1998 Lu et al.
5,886,315 A 3/1999 Lu et al.
5,977,510 A 11/1999 Lindsay et al.
5,994,663 A 11/1999 Lu
6,020,572 A 2/2000 Marner et al.
6,066,827 A 5/2000 Nemchinsky
6,084,199 A 7/2000 Lindsay et al.
6,114,649 A * 9/2000 Delcea ..................... H05H 1/34 119/75
6,114,650 A 9/2000 Marner et al.
6,130,399 A 10/2000 Lu et al.
6,137,078 A 10/2000 Keller et al.
6,207,923 B1 3/2001 Lindsay et al.
6,395,197 B1 * 5/2002 Detering ................ B01J 19/088 252/373
6,403,915 B1 6/2002 Cook et al.
6,423,922 B1 7/2002 Nemchinsky et al.
6,424,082 B1 7/2002 Hackett et al.
6,452,130 B1 9/2002 Qian et al.
6,483,070 B1 11/2002 Diehl et al.
6,614,001 B2 9/2003 Hackett et al.
6,686,559 B1 2/2004 Walters et al.
6,841,754 B2 1/2005 Cook et al.
6,946,617 B2 9/2005 Brandt et al.
6,969,819 B1 11/2005 Griffin et al.
7,019,255 B2 3/2006 Brandt et al.
7,081,597 B2 7/2006 Severance, Jr. et al.
7,193,174 B2 3/2007 Brandt et al.
7,256,366 B2 8/2007 Severance et al.
7,375,302 B2 5/2008 Twarog et al.
7,375,303 B2 5/2008 Twarog et al.
7,423,235 B2 9/2008 Severance, Jr. et al.
7,435,925 B2 10/2008 Griffin et al.
7,598,473 B2 10/2009 Cook et al.
7,605,340 B2 10/2009 Duan et al.
7,659,488 B2 2/2010 Cook et al.
7,754,993 B2 7/2010 Ortega et al.
7,829,816 B2 11/2010 Duan et al.
7,989,727 B2 8/2011 Twarog et al.
8,001,927 B2 * 8/2011 Dorier ...................... H05H 1/34 118/723 R
8,035,055 B2 10/2011 Twarog et al.
8,089,025 B2 1/2012 Sanders et al.
8,097,828 B2 1/2012 Roberts et al.
8,101,882 B2 1/2012 Mather et al.
D654,104 S 2/2012 Fitzpatrick et al.
8,115,136 B2 2/2012 Mather et al.
8,153,927 B2 4/2012 Twarog et al.
8,212,173 B2 7/2012 Liebold et al.
8,304,684 B2 11/2012 Currier et al.
8,338,740 B2 12/2012 Liebold et al.
8,389,887 B2 3/2013 Currier et al.
8,395,077 B2 3/2013 Duan et al.
8,449,763 B2 * 5/2013 Duyvesteyn ............. B01J 19/26 156/345.33
8,525,069 B1 9/2013 Mather et al.
8,541,712 B2 9/2013 Mather et al.
D692,402 S 10/2013 Dalton et al.
8,546,718 B2 10/2013 Mather et al.
8,546,719 B2 10/2013 Warren, Jr. et al.
8,581,139 B2 11/2013 Severance, Jr. et al.
8,633,417 B2 1/2014 Ashtekar et al.
8,651,394 B2 * 2/2014 Heinrich ................... C23C 4/12 239/1
8,680,460 B2 * 3/2014 Williams ........... G01N 30/7246 250/281
8,698,036 B1 4/2014 Kornprobst et al.
8,759,709 B2 6/2014 Mather et al.
8,772,667 B2 7/2014 Yang et al.
8,829,385 B2 9/2014 Yang et al.
2002/0185475 A1 12/2002 Horner-Richardson et al.
2004/0114300 A1 6/2004 Wang et al.
2004/0169018 A1 9/2004 Brasseur et al.
2006/0163216 A1 7/2006 Brandt et al.
2012/0012560 A1 1/2012 Roberts et al.
2013/0043224 A1 2/2013 Leiteritz et al.
2013/0306607 A1 11/2013 Mather et al.
2014/0021175 A1 1/2014 Chen et al.
2014/0110382 A1 4/2014 Beliveau et al.

FOREIGN PATENT DOCUMENTS

EP 0729805 A1 4/1996
EP 0790756 A2 8/1997
WO 9953734 A1 10/1999
WO 0028794 A1 5/2000
WO 2006113737 A2 10/2006
WO 2008101226 A1 2/2008
WO 2010111695 A1 9/2010
WO WO 2012/115533 A1 8/2012
WO 2012118826 A1 9/2012
WO 2014187438 A1 11/2014

OTHER PUBLICATIONS

International Application No. PCT/IB2015/001412, International Search Report & Written Opinion, 12 pages, Feb. 9, 2016.
International Application No. PCT/IB2015/000683 International Search Report & Written Opinion, 12 pages, Aug. 31, 2015.
International Application No. PCT/IB2015/000702, International Search Report & Written Opinion, 14 pages, Aug. 25, 2015.
International Application No. PCT/IB2015/000714, International Search Report & Written Opinion, 10 pages, Aug. 31, 2015.
International Application No. PCT/IB2015/001694, International Search Report & Written Opinion, 14 pages, Dec. 23, 2015.

* cited by examiner

NOZZLE THROAT FOR THERMAL PROCESSING AND TORCH EQUIPMENT

PRIORITY

The present application claims priority to U.S. Provisional Patent Application No. 61/943,594, which is incorporated herein by reference in its entirety.

TECHNICAL FIELD

Devices, systems, and methods consistent with the invention relate to cutting, and more specifically to devices, systems and methods for aligning and securing components of a plasma arc torch.

BACKGROUND

In many cutting, spraying and welding operations, plasma arc torches are utilized. With these torches, a plasma gas jet is emitted into the ambient atmosphere at a high temperature. The jets are emitted from a nozzle and, as they leave the nozzle, the jets are highly under-expanded and very focused. However, as the jet leaves the nozzle it begins to expand rapidly. This expansion can greatly reduce the efficiency of the nozzle as the jet energy is lost in the jet expansion, and thus there is a loss of jet thrust and focus. In applications, such as cutting and welding, this expansion can diminish the quality and process speeds, especially in cutting operations. Further, the shape of the nozzle throat can cause arc instability, which further diminishes performance. Therefore, improved nozzle performance is desirable.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a plasma torch nozzle and torch utilizing the nozzle, where the nozzle has a configuration which stabilizes and optimizes the plasma arc for improved performance.

In an exemplary embodiment of the invention, a nozzle assembly includes an upper portion defining an opening for receiving a gas and a longitudinally extending cylindrical body portion adjacent to the upper portion and defining a passageway for the gas. The nozzle assembly also includes a tip portion adjacent to the body portion, with the tip portion defining a throat channel. The throat channel includes a throat inlet region that focuses a flow of the gas. The throat inlet region is fluidly connected to the passageway via a throat inlet opening. The throat channel also includes an acceleration region that is disposed downstream of the throat inlet region and fluidly connected to the throat inlet region to compress the gas and accelerate the flow of the gas. The throat channel further includes an expansion region disposed downstream of the acceleration region and fluidly connected to the acceleration region to allow the gas to expand. The expansion region includes a throat outlet opening through which the gas exits the nozzle assembly.

In another exemplary embodiment a torch assembly used in cutting, spraying and/or welding operations includes an electrode and a swirl ring for receiving a gas. The torch assembly also includes a nozzle. The nozzle includes an upper portion defining an opening for receiving a portion of the electrode and a portion of the swirl ring such that an annular channel is formed to receive the gas. The nozzle also includes a longitudinally extending cylindrical body portion adjacent to the upper portion that extends the annular channel for the gas and a tip portion adjacent to the body portion that defines a throat channel. The throat channel includes a throat inlet region to focus a flow of the gas, the throat inlet region being fluidly connected to the passageway via a throat inlet opening. The throat channel also includes an acceleration region disposed downstream of the throat inlet region and fluidly connected to the throat inlet region to compress the gas and accelerate the flow of the gas. The throat channel further includes an expansion region disposed downstream of the acceleration region and fluidly connected to the acceleration region to allow the gas to expand. The expansion region includes a throat outlet opening through which the gas exits the nozzle assembly.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to nozzle and nozzle throat configurations for a plasma arc torch that can be useful in various cutting, welding and spraying operations. It should be noted that for purposes of brevity and clarity, the following discussion will be directed to exemplary embodiments of the present invention which are primarily directed to a plasma torch for cutting. However, embodiments of the present invention are not limited in this regard and embodiments of the present invention can be used in welding and spraying torches without departing from the spirit or scope of the present invention. The application of the present invention can include use in either mechanized torch assemblies or hand-held torch assemblies. Various types and sizes of torches are possible at varying voltages if desired. Further, the torches using the disclosed nozzles could be used for marking, cutting or metal removal. Additionally, exemplary embodiments of the present invention, can be used with varying currents and varying power levels. Of course, it should also be noted that embodiments of the present invention can be used in torches which are cooled with a torch coolant. The construction and utilization of such coolant systems are known and need not be discussed in detail herein.

Figure 1:
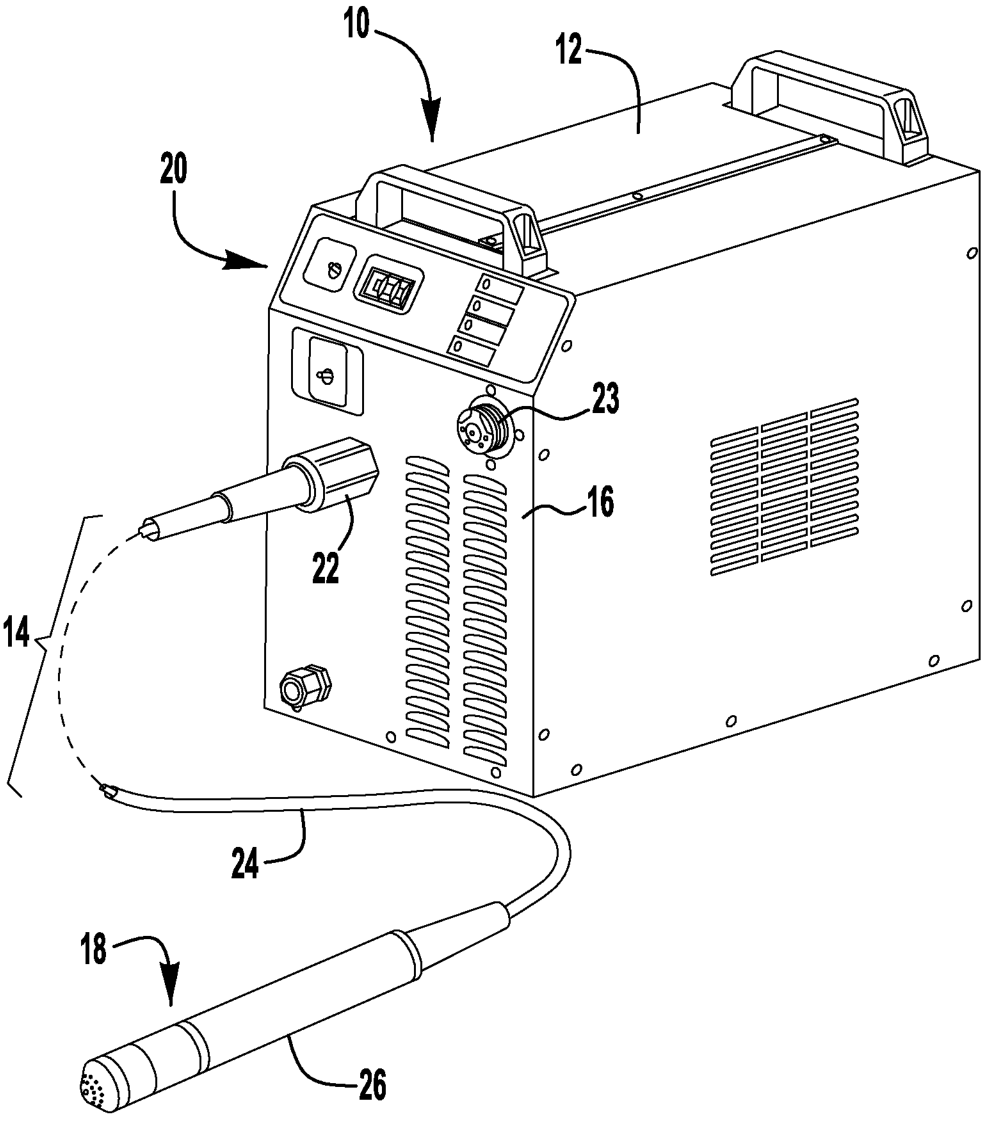
FIG. 1 is a perspective view of one example of a plasma arc torch system according to certain aspects of the disclosure.

FIG. 1 shows one example of such a plasma arc torch device 10. As shown, device 10 includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 14 is attached to a front side 16 of housing 12. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch body 26 in connection with the relevant portions within housing 12.

Figure 2:
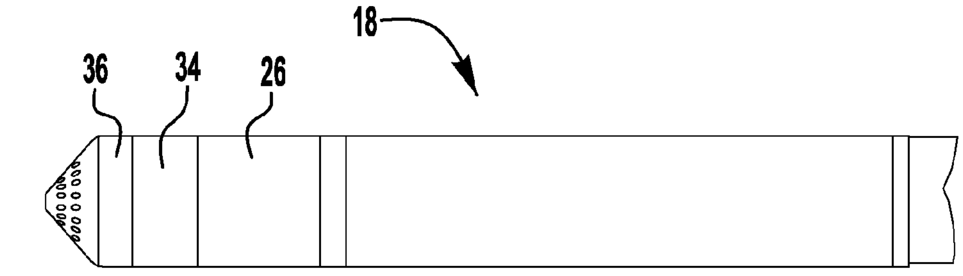
FIG. 2 is a perspective view of the torch portion of the system of FIG. 1.
Figure 3:
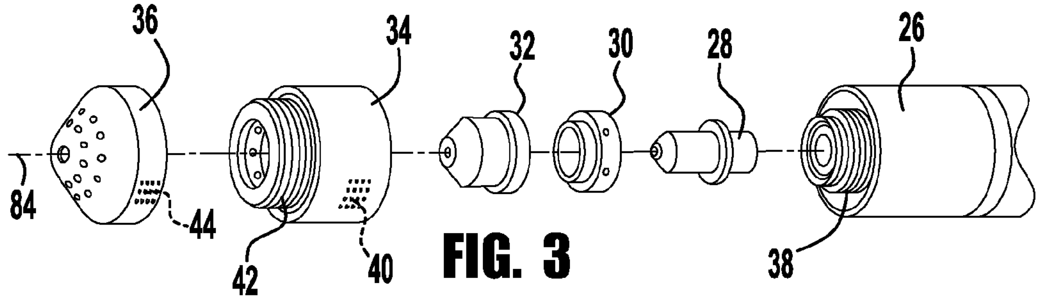
FIG. 3 is an exploded perspective view of the end of the torch portion of FIG. 2.

FIG. 3 shows an exploded view of the end of torch body 26. As shown therein, attached to torch body 26 are electrode 28, swirl ring 30, nozzle 32, retaining cap 34, and shield cap 36. First mating threads 38 and 40 on torch body 26 and retaining cap 34, and second mating threads 42 and 44 on retaining cap 34 and shield cap 36 may be used to hold these pieces together on the end of torch body 26 in the configuration shown in FIG. 2. The sizes, dimensions and arrangements of these elements may be varied somewhat depending on the desired amperage, flow, work to be performed, etc. as is conventional, and additional parts may be employed in some arrangements depending on the application.

Figure 4:
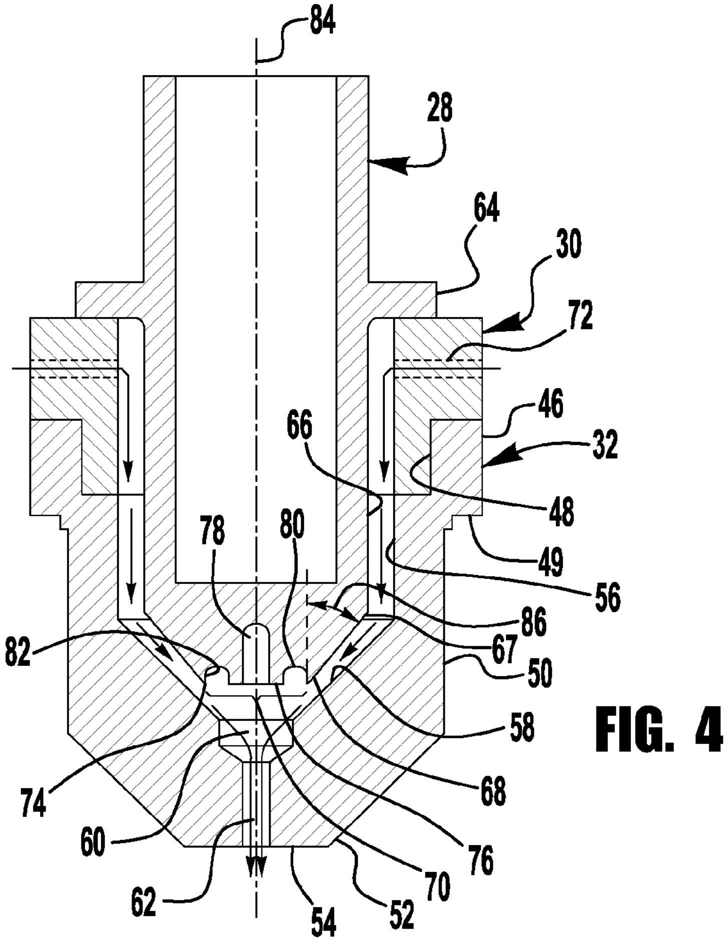
FIG. 4 is a cross-sectional view of the electrode and nozzle portion of the torch of FIG. 2.

FIG. 4 shows an enlarged cross section of an electrode 28, swirl ring 30 and nozzle 32 according to certain aspects of the invention. For clarity in FIG. 4, other elements of torch body 26 are not shown.

As shown, nozzle 32 includes an upper annular seating section 46 with an annular inner opening 48 for receiving a portion of swirl ring 30 and an outer annular shoulder 49 for contacting an inner portion of retaining cap 34 (not shown in FIG. 4). Nozzle 32 further includes along its outside a longitudinally extending body portion 50 and a tapered portion 52 ending in a flat tip 54. Within nozzle 32 is defined a passageway including a cylindrical portion 56, a tapered portion 58, a transition area 60 and a reduced diameter outlet passage 62 exiting nozzle 32 via flat tip 54.

Electrode 28 is a substantially cylindrical body. Flange 64 is provided to position electrode 28 for mounting in torch body 26 and to position the electrode relative to swirl ring 30 and nozzle 32 once all are assembled together, and threads (not shown) may be provided to assist in assembly of electrode 28 to torch body 26. A central cylindrical portion 66 of electrode 28 ends at a tapered portion 68, which faces tapered portion 58 of nozzle 32 once assembled together. A distal end face 70 of electrode 28 is located opposite outlet passage 62. A small curved portion 67 may be present between cylindrical portion 66 and tapered portion 68 as a smoothing transition, if desired.

In use, gas flows inwardly through passages 72 within swirl ring 30, down the passageway formed between cylindrical portion 56 of nozzle 32 and cylindrical portion 66 of electrode 28 and the two tapered portions 58 and 68 to and through outlet passage 62. Suitable conventional seal members (not shown) may be provided as desired between torch body 26, electrode 28, swirl ring 30, nozzle 32, retaining cap 34, and/or shield cap 36, etc. to confine gas flow to desired passageways and prevent leakage through interfaces, threaded areas, etc.

End face 70 of electrode 28 has a discontinuous surface. Tapered portion 68 includes a discontinuity, in this case an annular edge 74. In the embodiment as shown in FIG. 4, annular edge 74 is the most distal portion of electrode 28, although it should be understood that the annular edge need not be the most distal portion.

Nozzle tapered portion 58 may be at the same angle or a different angle than tapered portion 68 with reference to longitudinal axis 82. As shown, tapered portion 68 is at a slightly different angle than tapered portion 58, so that the space between electrode 28 and nozzle 32 decreases slightly in the distal direction (toward outlet passage 62).

A number of variations to the above elements are possible, in particular to electrode 28. In the additional embodiments below, like or similar reference numerals refer to like or similar parts.

Figure 5:
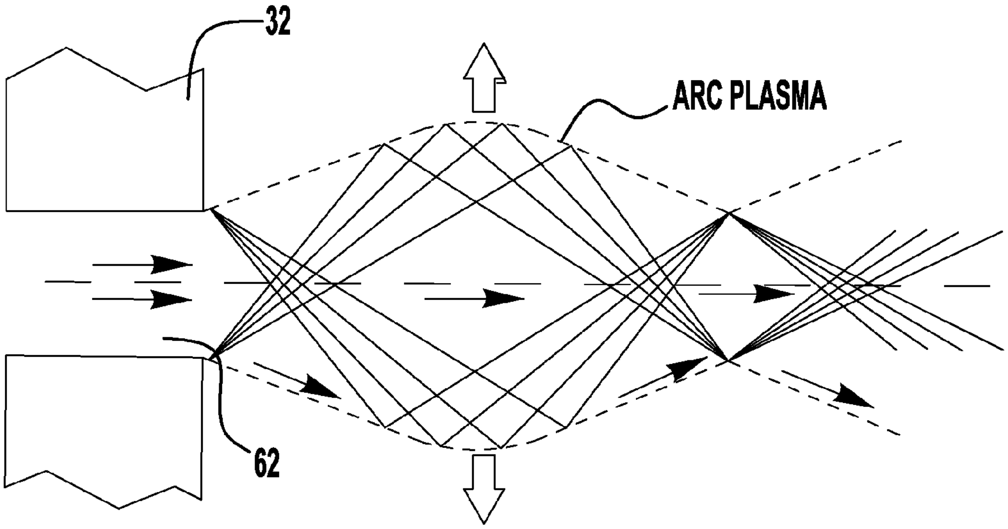
FIG. 5 is a diagrammatical representation of a plasma jet as it exits a known torch nozzle configuration.
Figure 6:
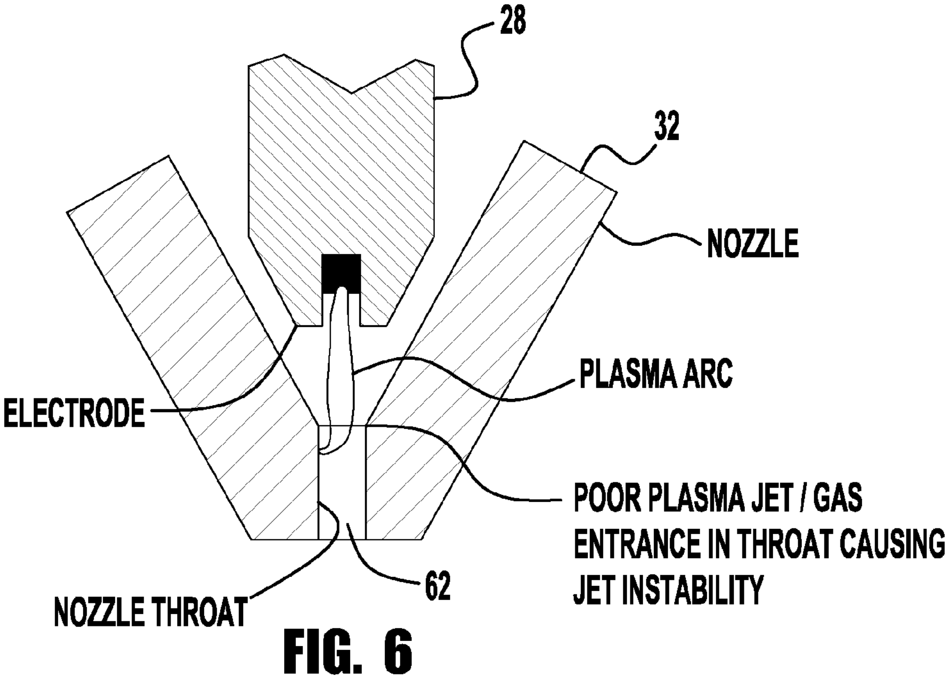
FIG. 6 is a diagrammatical representation of a plasma jet as it is projected from an electrode to a nozzle of a known configuration.

Turning now to FIG. 5, an arc plasma is shown exiting the related art outlet passage 62 of a typical nozzle 32. As shown, immediately after the arc plasma jet leaves the passage 62, it begins to expand rapidly which can diminish the performance and effectiveness of the plasma. This is particular true in cutting operations. Further, as shown in FIG. 6, in many instances the arc created by the electrode 28 can contact the side walls of the related art outlet passage 62 in the nozzle 32 which further aids in destabilizing the plasma jet as it leaves the nozzle. Embodiments of the present invention significantly improve in the performance of the plasma jet and torch assembly overall. This is discussed further below.

Figure 7:
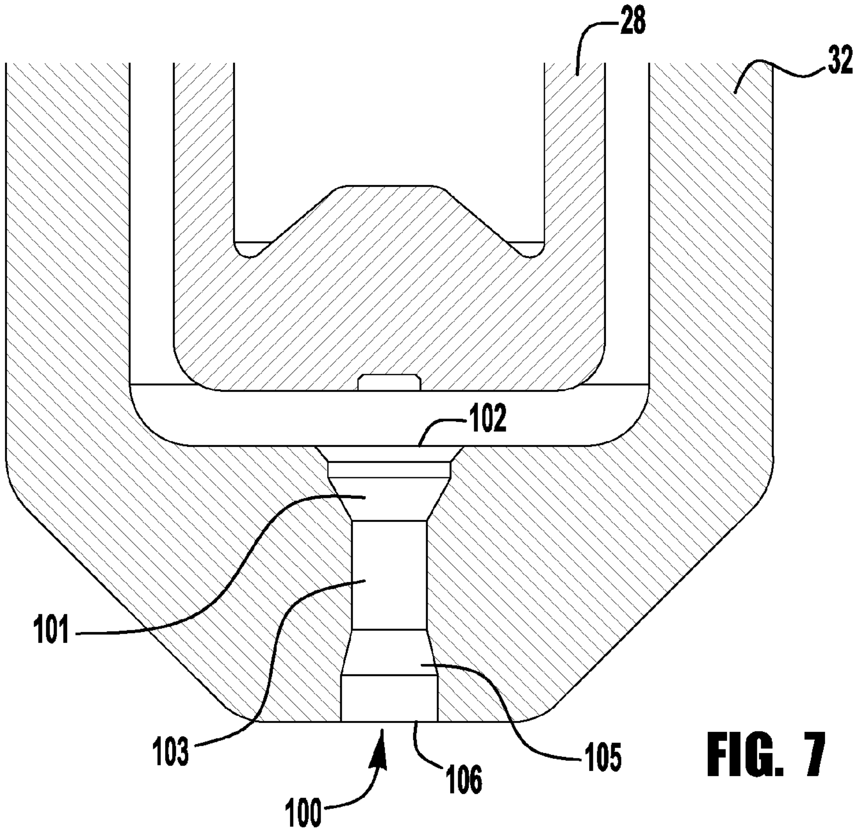
FIG. 7 is a cross-section of an exemplary embodiment of a nozzle end portion and an electrode.

FIG. 7 depicts an exemplary embodiment of the present invention, where only the electrode 28 and nozzle 32 of a torch assembly is shown. As stated previously, embodiments of the present invention are not limited to being used in only cutting operations, but can also be used in spraying and welding operations. As shown, embodiments of the present invention, use a particular nozzle throat 100 (or outlet passage) configuration as shown. The nozzle throat 100 has an inlet 102 which is positioned adjacent to the distal end of the electrode 32 when assembled, and an outlet 106 through which the plasma jet leaves the nozzle 32. Further, the throat 100 is defined by three throat sections. The upstream most section is the throat inlet region 101, which is followed by the acceleration region 103, and then the downstream most region is the expansion region 105. The interaction of these regions with the plasma jet as it passes through the throat 100 provides for an optimized and focused plasma jet that minimizes its expansion after it leaves the nozzle 32, as well as providing a throat 100 which aids in minimizing the contact between the arc and the sidewalls of the throat 100. Further discussion of the throat 100 is discussed below with respect to FIG. 8.

Figure 8:
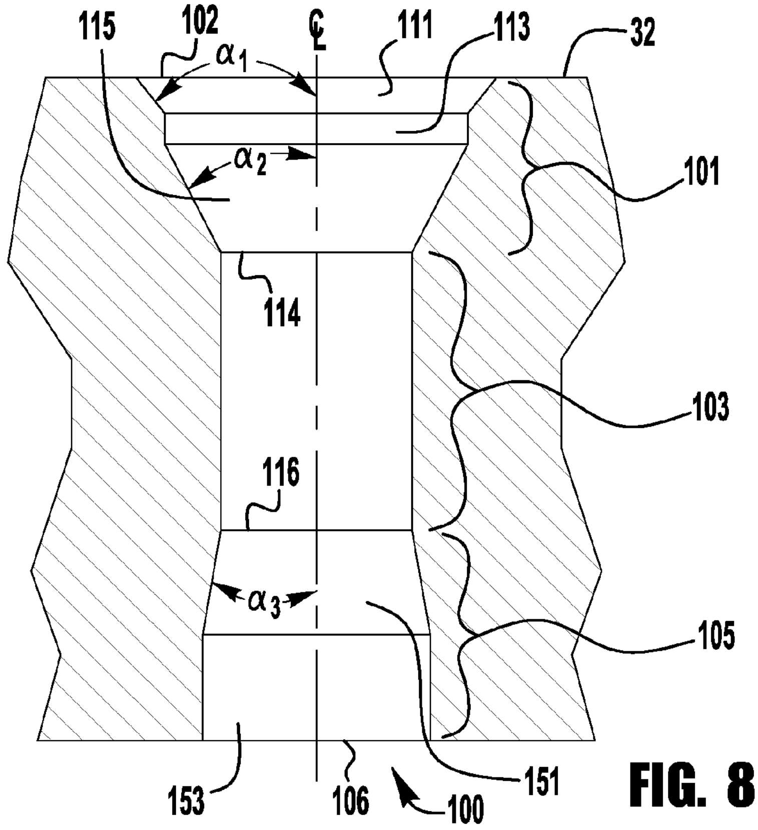
FIG. 8 is a cross-sectional close-up view of a throat portion at the end of the nozzle shown in FIG. 7.

FIG. 8 shows more detail of the nozzle throat 100 of the present invention. As stated earlier, the upstream most section of the throat 100 is the throat inlet region 101. The throat inlet region generally has a generally tapered profile from the inlet 102 to the transition 114 between the inlet region 101 to the acceleration region 103. Typically, the inlet 102 has a diameter that is in the range of 0.015 to 0.65 in, and is in the range of 30 to 400% larger than that of the diameter of the acceleration region 103. As shown, the acceleration region 103 has a constant diameter from the upstream transition 114 to the downstream transition 116 between the acceleration region 103 and the expansion region 105, and the diameter of the acceleration region in is in the range of 0.015 to 0.5 in. The expansion region 105 has a generally tapered profile as shown where the diameter of the outlet 106 is larger than that of the diameter of the acceleration region 103. In exemplary embodiments of the present invention, the outlet 106 has a diameter in the range of 0.015 to 0.65 in, and can be in the range of 5 to 50% larger than the diameter of the acceleration region 103.

In exemplary embodiments, the length of the inlet region 101 is in the range of 5 to 30% of the thickness of the nozzle 32 at the throat. The acceleration region 103 is in the range of 30 to 85% of the thickness of the nozzle 32 at the throat and the expansion region 105 is in the range of 5 to 85% of the thickness of the nozzle 32 at the throat.

With this configuration, the inlet region 101 stabilizes the plasma jet as it enters the throat 100 from the electrode 28. This aids in preventing the plasma from inadvertently contacting the side walls of the throat and helps to focus the plasma jet. As the jet enters the acceleration region 103 the jet is compressed by the side walls and the flow of the jet is accelerated. When the jet passes from the acceleration region 103 to the expansion region 105, the plasma jet is allowed to expand. However, the expansion is controlled by the sidewalls of the expansion region 105 such that as the jet leaves the outlet 106 it does not rapidly expand like when using prior known nozzles. The expansion is less drastic and thus provides a more focused and controller plasma jet. Thus, embodiments of the present result in the creation of more accurate cuts (when used in a cutting application).

Also, as shown in FIG. 8, in some exemplary embodiments, each of the inlet region 101 and the expansion region 105 can have distinct portions to aid in optimizing the flow of plasma jet as it passes through the throat 100. As shown, in some exemplary embodiments, the inlet region 101 has three distinct portions—a first or inlet portion 111, a transition portion 113, and a focus portion 115. Similarly, in some exemplary embodiments, the expansion region 105 has an expansion portion 151 and a stabilization portion 153.

In the inlet region 101, the inlet portion 111 has a tapered wall surface as shown. This surface aids in ensure that the plasma jet properly enters the throat and begins to focus the jet to the center of the throat. In exemplary embodiments, the inlet portion 111 has an angled wall surface that is angled ($\alpha_1$) in the range of 45 to 75 degrees, with respect to the centerline of the throat 100. Further, the length of the inlet portion 111 (along the centerline) is in the range of 10 to 60% of the length of the inlet region 101. Following the inlet portion 111 is the transition portion 113 which permits the jet to stabilize briefly after it enters throat 100. In exemplary embodiments of the present invention, the angling of the inlet portion 111 is not steeper than that of the focus portion 115 (i.e., $\alpha_2$ value is lower than $\alpha_1$ value), and thus the transition portion 113 aids in stabilizing the plasma prior to be more fully focused in the focus portion 115. In the embodiment shown, the transition portion 113 has a constant diameter along its length. However, in other exemplary embodiments, the transition portion 113 can also have an angled or an arcuate surface to allow for a transition from the inlet portion to the focus portion 115 of the inlet region 101. In exemplary embodiments, the transition portion 113 has a length in the range of 20 to 80% of the length of the inlet region 101. The focus portion 115 focuses and compresses the plasma jet before it enters the acceleration portion 103 of the throat 100. As shown, in exemplary embodiments the focus portion 115 is the longest portion of the inlet region 101 and has an angled surface. The angle ($\alpha_2$) of the surface is in the range of 30 to 55 degrees with respect to the centerline of the throat and typically has a shallower angle than inlet portion 111. Further, in some embodiments, the length of the focus portion 115 is in the range of 5 to 95% of the length of the inlet region 101. In some embodiments, the length of the focus portion 115 is in the range of 10 to 90% of the length of the inlet region 101. In the embodiment shown, the angle of the surface of the focus portion 115 is constant from the transition portion 113 to the transition 114. However, in other exemplary embodiments, the focus portion 115 can use at least two different angles between the transition portion 113 and the transition 114.

Also as shown in FIG. 8, the expansion region 105 has an expansion portion 151 which has an angled surface that expands as it goes toward the outlet 106. This portion allows the jet to expand in a controlled manner. In exemplary embodiments, the wall of the expansion portion 151 is angled at an angle ($\alpha_3$) in the range of 2 to 30 degrees, relative to the centerline of the throat, and a length in the range of 5 to 95% of the length of the expansion portion 105. Downstream of the expansion portion 151 is a stabilization portion 153 which stabilizes the plasma jet after it has been expanded. This stabilization portion allows the jet to exit the outlet 106 in a more focused state as compared to known nozzles and prevents the over-expansion of the jet prior to the workpiece. More specifically, the stabilization portion allows the jet to be perfectly expanded for various cutting operations. In the embodiment shown in FIG. 8, the diameter of the stabilization portion has a constant diameter along its length. However, in other exemplary embodiments, the wall of the stabilization portion can be angled, and can be angled either toward or away from the centerline. However, in either case, to the extent the wall is angled in the stabilization portion, the angle is less than the angle of the wall in the expansion portion 151. Further, in exemplary embodiments, the outlet 106 has a diameter which is less than that of the inlet 102. In exemplary embodiments, the outlet 106 has a diameter in the range of 10 to 50% of the diameter of the acceleration region 103.

In further exemplary embodiments, the nozzle 32 can be constructed from a plurality of components that—when coupled together—created a nozzle assembly similar in construction to the nozzle 32 described above and shown in the Figures. In such embodiments, each of the separate nozzle components include portions of the throat 100, such that when the components are assembled they formed a completed throat 100. For example, in some embodiments, the nozzle 32 can be made of three separate components, such that when they are coupled together they form the throat 100. In such an embodiment, an inner nozzle portion contains only the inlet region 101, an intermediate nozzle portion contains only the acceleration region 103, and an outer nozzle portion contains only the expansion region 105. When these separate and distinct nozzle components are assembled, they form the completed nozzle assembly (similar to 32) and have the entire throat 100. They can be assembled via any known methodology, including screwing each of the nozzle portions to each other via threads. Other connection means can also be used. When assembled there gaps between the separate components should be small so as to ensure optimum performance of the throat 100. Such embodiments allow a user to only replace a portion of the nozzle assembly that may be damaged, without having to replace the other nozzle components. Further, embodiments such as these allow a user to couple different throat geometries as needed. That is, a user can have a plurality of each of the inner, intermediate and outer nozzle portions—each having differing dimensions for their respect throat regions. With this, a user can assemble a custom nozzle assembly having an optimized throat configuration for a given cutting operation. That is, a user can create a custom nozzle and throat for a given operation. Further, in other exemplary embodiments, the nozzle 32 can be made from two separate and distinct components where one of the nozzle components contains two out of the three regions described above, while the other contains the other region. For example, a first nozzle portion contains the inlet and acceleration regions 101/103, and the other nozzle portion contains the expansion region 105. This configuration can allow a user to, again, assembly various nozzle components to achieve a customized throat 100 for a desired plasma jet configuration. Further, this can allow a user to replace only a portion of the nozzle, if only that portion was damaged.

It should be noted that in some exemplary embodiments of the present invention, the torch, nozzle and electrode are constructed such that the distance or gap between electrode and nozzle can be adjusted. This adjustment allows a user to obtain a desired plasma jet performance and configuration. For example, a screw type connection can be used to adjust the distance between these components. Thus, in use a user can adjust this distance prior to cutting.

With the embodiments described herein an optimized nozzle and throat configuration can be attained for a particular function. That is, with embodiments of the present invention, a plasma jet can be created at a desired velocity and focus for a particular operation. Because of this, performance and precision levels can be achieved that cannot be achieved by known nozzle configurations.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A nozzle assembly for a torch, the assembly comprising:

an upper portion defining an opening for receiving a gas;

a longitudinally extending cylindrical body portion adjacent to the upper portion and defining a passageway for the gas; and a tip portion adjacent to the cylindrical body portion, an outer surface of the tip portion having a tapered segment at a distal end of the tip portion, the tip portion defining a throat channel, the throat channel including, a throat inlet region to focus a flow of the gas, the throat inlet region being fluidly connected to the passageway via a throat inlet opening, an acceleration region disposed downstream of the throat inlet region and fluidly connected to the throat inlet region to compress the gas and accelerate the flow of the gas, and an expansion region disposed downstream of the acceleration region and fluidly connected to the acceleration region to allow the gas to expand, the expansion region including a throat outlet opening through which the gas exits the nozzle assembly, wherein the cylindrical body portion is configured to receive an electrode such that there is a gap between the throat inlet opening and the electrode.

2. The nozzle assembly of claim 1, wherein the throat inlet region has a tapered profile, and wherein a diameter at the throat inlet opening is larger than a diameter at the acceleration region that is adjacent to the throat inlet region.

3. The nozzle assembly of claim 2, wherein the diameter at the throat inlet opening is 30 percent to 400 percent larger than the diameter at the acceleration region that is adjacent to the throat inlet region.

4. The nozzle assembly of claim 1, wherein a diameter at the throat inlet opening is in a range of 0.15 to 0.65 in.

5. The nozzle assembly of claim 1, wherein the acceleration region has a constant diameter.

6. The nozzle assembly of claim 5, wherein the diameter at the acceleration region is in a range of 0.15 to 0.50 in.

7. The nozzle assembly of claim 1, wherein the expansion region has a tapered profile, and wherein a diameter at the throat outlet opening is larger than a diameter at the acceleration region that is adjacent to the expansion region.

8. The nozzle assembly of claim 7, wherein the diameter at the throat outlet opening is 5 to 45 percent larger than the diameter at the acceleration region that is adjacent to the expansion region.

9. The nozzle assembly of claim 1, wherein a diameter at the throat outlet opening is in a range of 0.15 to 0.65 in.

10. The nozzle assembly of claim 1, wherein the expansion region comprises, an expansion portion with a tapered sidewall that expands the gas, and a stabilization portion disposed downstream of the expansion portion to stabilize the expansion of the gas prior to the gas exiting the nozzle assembly.

11. The nozzle assembly of claim 10, wherein an angle of the tapered sidewall with respect to a centerline of the throat channel is in a range of 2 degrees to 30 degrees.

12. The nozzle assembly of claim 10, wherein a length of the expansion portion along a centerline of the throat channel is 5 to 95 percent of a length of the expansion region along the centerline of the throat channel.

13. The nozzle assembly of claim 10, wherein the stabilization portion has a constant diameter along a length of the stabilization portion.

14. The nozzle assembly of claim 10, wherein a sidewall of the stabilization portion is angled.

15. The nozzle assembly of claim 1, wherein a diameter of the throat outlet opening is 10 to 50 percent of a diameter of the acceleration region.

16. The nozzle assembly of claim 1, wherein at least one of the throat inlet region, the acceleration region and the expansion region is a separate component.

17. A nozzle assembly for a torch, the assembly comprising:

an upper portion defining an opening for receiving a gas;

a longitudinally extending cylindrical body portion adjacent to the upper portion and defining a passageway for the gas; and a tip portion adjacent to the cylindrical body portion, an outer surface of the tip portion having a tapered segment at a distal end of the tip portion, the tip portion defining a throat channel, the throat channel including, a throat inlet region to focus a flow of the gas, the throat inlet region being fluidly connected to the passageway via a throat inlet opening, wherein the throat inlet region comprises, an inlet portion with a first tapered sidewall to begin focusing the flow of the gas, gas after the inlet portion, and a focus portion disposed downstream of the transition portion, the focus portion including a second tapered sidewall to further focus the flow of the gas, an acceleration region disposed downstream of the throat inlet region and fluidly connected to the throat inlet region to compress the gas and accelerate the flow of the gas, and an expansion region disposed downstream of the acceleration region and fluidly connected to the acceleration region to allow the gas to expand, the expansion region including a throat outlet opening through which the gas exits the nozzle assembly, wherein the cylindrical body portion is configured to receive an electrode such that there is a gap between the throat inlet opening and the electrode.

18. The nozzle assembly of claim 17, wherein a first angle of the first tapered sidewall with respect to a centerline of the throat channel is steeper than a second angle of the second tapered sidewall with respect to the centerline of the throat channel.

19. The nozzle assembly of claim 18, wherein the first angle in a range of 45 degrees to 75 degrees.

20. The nozzle assembly of claim 18, wherein the second angle in a range of 30 degrees to 55 degrees.

21. The nozzle assembly of claim 17, wherein a length of the inlet portion along a centerline of the throat channel is 10 to 60 percent of a length of the throat inlet region along the centerline of the throat channel.

22. The nozzle assembly of claim 17, wherein a length of the transition portion along a centerline of the throat channel is 20 to 80 percent of a length of the throat inlet region along the centerline of the throat channel.

23. The nozzle assembly of claim 17, wherein a length of the focus portion along a centerline of the throat channel is 5 to 95 percent of a length of the throat inlet region along the centerline of the throat channel.

24. The nozzle assembly of claim 17, wherein a diameter at the throat inlet opening is 30 percent to 400 percent larger than a diameter at the acceleration region that is adjacent to the throat inlet region.

25. The nozzle assembly of claim 17, wherein a diameter at the throat inlet opening is in a range of 0.15 to 0.65 in.

26. The nozzle assembly of claim 17, wherein the acceleration region has a constant diameter.

27. The nozzle assembly of claim 26, wherein the diameter at the acceleration region is in a range of 0.15 to 0.50 in.

28. The nozzle assembly of claim 17, wherein a diameter at the throat outlet opening is 5 to 45 percent larger than a diameter at the acceleration region that is adjacent to the expansion region.

29. The nozzle assembly of claim 17, wherein a diameter at the throat outlet opening is in a range of 0.15 to 0.65 in.

30. The nozzle assembly of claim 17, wherein the expansion region comprises, an expansion portion with a tapered sidewall that expands the gas, and a stabilization portion disposed downstream of the expansion portion to stabilize the expansion of the gas prior to the gas exiting the nozzle assembly.

31. The nozzle assembly of claim 30, wherein an angle of the tapered sidewall with respect to a centerline of the throat channel is in a range of 2 degrees to 30 degrees.

32. The nozzle assembly of claim 30, wherein a length of the expansion portion along a centerline of the throat channel is 5 to 95 percent of a length of the expansion region along the centerline of the throat channel.

33. The nozzle assembly of claim 30, wherein the stabilization portion has a constant diameter along a length of the stabilization portion.

34. The nozzle assembly of claim 30, wherein a sidewall of the stabilization portion is angled.

35. The nozzle assembly of claim 17, wherein a diameter of the throat outlet opening is 10 to 50 percent of a diameter of the acceleration region.

36. The nozzle assembly of claim 17, wherein at least one of the throat inlet region, the acceleration region and the expansion region is a separate component.

37. A nozzle assembly for a torch, the assembly comprising:

an upper portion defining an opening for receiving a gas;

a longitudinally extending cylindrical body portion adjacent to the upper portion and defining a passageway for the gas; and a tip portion adjacent to the body portion, the tip portion defining a throat channel, the throat channel including, a throat inlet region to focus a flow of the gas, the throat inlet region being fluidly connected to the passageway via a throat inlet opening, an acceleration region disposed downstream of the throat inlet region and fluidly connected to the throat inlet region to compress the gas and accelerate the flow of the gas, and an expansion region disposed downstream of the acceleration region and fluidly connected to the acceleration region to allow the gas to expand, the expansion region including a throat outlet opening through which the gas exits the nozzle assembly, wherein the throat inlet region comprises, an inlet portion with a first tapered sidewall to begin focusing the flow of the gas, a transition portion disposed downstream of the inlet portion to stabilize the flow of the gas after the inlet portion, and a focus portion disposed downstream of the transition portion, the focus portion including a second tapered sidewall to further focus the flow of the gas, wherein the focus portion includes at least one additional tapered sidewall in addition to the second tapered sidewall, and wherein an angle of the at least one additional tapered sidewall with respect to a centerline of the throat channel is different from an angle of the second tapered sidewall with respect to the centerline of the throat channel.

38. A torch assembly used in cutting, spraying or welding operations, the assembly comprising:

an electrode;

a swirl ring to receive a gas;

a nozzle, the nozzle comprising an upper portion defining an opening to receive a portion of the electrode and a portion of the swirl ring such that an annular channel is formed to receive the gas;

a longitudinally extending cylindrical body portion adjacent to the upper portion that extends the annular channel for the gas; and a tip portion adjacent to the cylindrical body portion, an outer surface of the tip portion having a tapered segment at a distal end of the tip portion, the tip portion defining a throat channel, the throat channel including, a throat inlet region to focus a flow of the gas, the throat inlet region being fluidly connected to the passageway via a throat inlet opening, wherein the throat inlet region comprises an inlet portion with a first tapered sidewall to begin focusing the flow of the gas, a transition portion disposed downstream of the inlet portion to stabilize the flow of the gas after the inlet portion, and a focus portion disposed downstream of the transition portion, the focus portion including a second tapered sidewall to further focus the flow of the gas, an acceleration region disposed downstream of the throat inlet region and fluidly connected to the throat inlet region to compress the gas and accelerate the flow of the gas, and an expansion region disposed downstream of the acceleration region and fluidly connected to the acceleration region to allow the gas to expand, the expansion region including a throat outlet opening through which the gas exits the nozzle assembly, wherein the cylindrical body portion is configured to receive the electrode such that there is a gap between the throat inlet opening and the electrode.

* * * * *